United States Patent
Salle et al.

(10) Patent No.: US 9,424,539 B2
(45) Date of Patent: Aug. 23, 2016

(54) SYSTEMS AND METHODS FOR DEFINING BEST PRACTICES, MANAGING BEST PRACTICES, AND VALIDATING SERVICE MODELS

(75) Inventors: Mathias Salle, San Francisco, CA (US); Erik Eidt, Campbell, CA (US); Wei-Wei Zhou, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 2303 days.

(21) Appl. No.: 12/261,760

(22) Filed: Oct. 30, 2008

(65) Prior Publication Data

US 2010/0036509 A1 Feb. 11, 2010

Related U.S. Application Data

(60) Provisional application No. 61/087,575, filed on Aug. 8, 2008.

(51) Int. Cl.
*G06F 7/60* (2006.01)
*G06F 17/10* (2006.01)
*G06Q 10/06* (2012.01)
*G06Q 10/04* (2012.01)

(52) U.S. Cl.
CPC .............. *G06Q 10/06* (2013.01); *G06Q 10/04* (2013.01)

(58) Field of Classification Search
CPC ............................ G06Q 10/06; G06Q 10/04

USPC ............................................................ 703/2
See application file for complete search history.

(56) References Cited

PUBLICATIONS

Brown et al. "A Best Practice Approach for Automating IT Management Processes", 2006 IEEE.*
Wieringa et al. "Applications of Deontic Logic in Computer Science : A Concise Overview", 1993 Citeseer.*

* cited by examiner

*Primary Examiner* — Saif Alhija
(74) *Attorney, Agent, or Firm* — Hewlett Packard Enterprise Patent Department

(57) ABSTRACT

Methods, systems, and computer program products are provided for managing best practices in modeling information technology (IT) services. An architecture for validating a service model using a plurality of best practices (PBPs) provides separation of concern between the service model and selection of best practices by enabling an independent selection of the service model and the PBPs. A best practice precedence (BPP) is configured to disambiguate conflicts between the PBPs and select a selected best practice (SBP) from the PBPs. A validation engine validates a compliance or non-compliance of the service model with the SBP. A refined service model is generated by combining selective portions of the SBP with the service model.

21 Claims, 6 Drawing Sheets

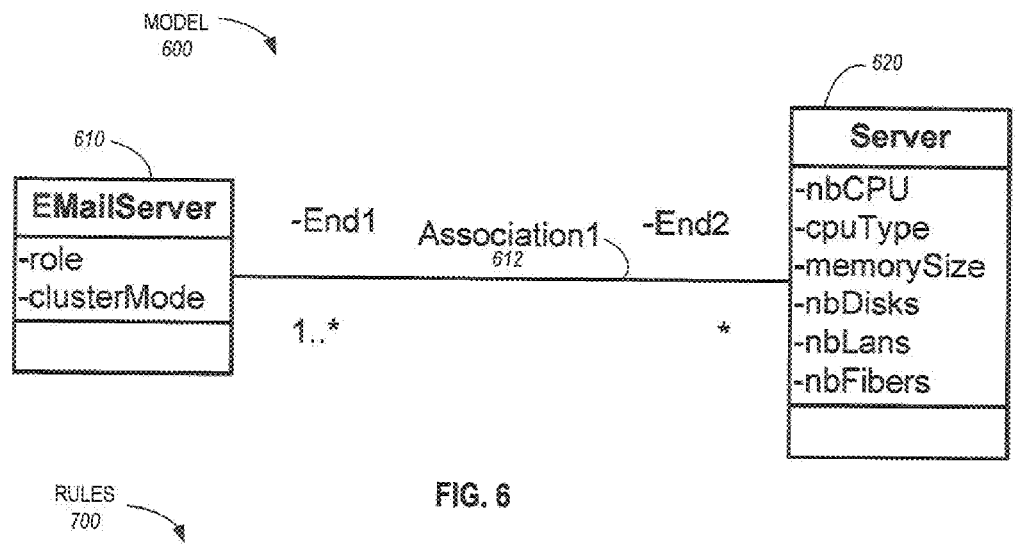

FIG. 6

| RULES 700 | |
|---|---|
| STATEMENT PRECEDENCE | IF S.SUB.X(A) AND T.SUB.Y.(B) AND PRECEDES (S,T) THEN S.SUB.X(A) IS THE STATEMENT TO VALIDATE ON THE MODEL |
| TOPIC PRECEDENCE | IF S.SUB.X(A) AND T.SUB.Y.(B) AND PRECEDES (X,Y) THEN S.SUB.X(A) IS THE STATEMENT TO VALIDATE ON THE MODEL |
| PRACTICE PRECEDENCE | IF S.SUB.X(A) AND T.SUB.Y.(B) AND PRECEDES (A,B) THEN S.SUB.X(A) IS THE STATEMENT TO VALIDATE ON THE MODEL |
| WEAK TOPIC TO STATEMENT PRECEDENCE | IF S.SUB.X(A) AND T.SUB.Y.(B) AND PRECEDES (S,T) AND PRECEDES (Y,X) THEN S.SUB.X(A) IS THE STATEMENT TO VALIDATE ON THE MODEL |
| WEAK PRACTICE TO TOPIC PRECEDENCE | IF S.SUB.X(A) AND T.SUB.Y.(B) AND PRECEDES (X,Y) AND PRECEDES (B,A) THEN S.SUB.X(A) IS THE STATEMENT TO VALIDATE ON THE MODEL |
| WEAK PRACTICE TO STATEMENT PRECEDENCE | IF S.SUB.X(A) AND T.SUB.Y.(B) AND PRECEDES (S,T) AND PRECEDES (B,A) THEN S.SUB.X(A) IS THE STATEMENT TO VALIDATE ON THE MODEL |
| PRECEDENCE TRANSITIVITY | PRECEDES(S,T) AND PRECEDES(T,U) THEN PRECEDES(S,U) IS TRUE WHERE S, T AND U CAN EITHER BE STATEMENTS, TOPICS OR PRACTICES |

FIG. 7

SYSTEMS AND METHODS FOR DEFINING BEST PRACTICES, MANAGING BEST PRACTICES, AND VALIDATING SERVICE MODELS

CROSS-REFERENCE TO RELATED APPLICATION

This Utility Patent Application is based on and claims the benefit of U.S. Provisional Application No. 61/087,575, filed on Aug. 8, 2008, the contents of which are hereby incorporated by reference in their entirety.

BACKGROUND OF THE INVENTION

Over the last few years, information technology (IT) organizations have increasingly adopted standards and best practices to ensure efficient IT service delivery. In this context, the IT Infrastructure Library (ITIL) has been rapidly adopted as the de facto standard. ITIL defines a set of standard processes for the management of IT service delivery organized in processes for Service Delivery (Service Level Management, Capacity Management, Availability Management, IT Continuity Management and Financial Management) and Service Support (Release Management, Configuration Management, Incident Management, Problem Management and Change Management). The Service Support processes, such as Configuration Management, Incident Management, and Configuration Management are some of the more common processes IT organizations have implemented to bring their service to an acceptable level for their businesses.

Service-Oriented Architecture (SOA) is an emerging concept that describes an architectural style or approach centered on the development of business processes packaged as services. SOA defines the IT infrastructure to allow different applications to exchange data and participate in the business processes. These functions are loosely coupled with the operating systems and programming languages underlying the applications.

It is common practice for users to capture service structure by defining service models. A service model is the representation of a service within the SOA. It defines the externally visible description, behavior, state, and operations available from a service to other services. The development of best practices is typically an evolutionary and collaborative process. Best practices are typically developed to improve the service models, thereby improving efficiency of IT services. Thus, best practices are often developed internally within an enterprise as well as externally by several enterprises working collaboratively in workgroups. However, the editing of a service model to incorporate one or more best practices is often performed by different authors that have different skills and different concerns depending on their perspective. Thus, editing of a service model by multiple authors may run into challenges such as software version control and management, including branch tree version control (e.g., fork reconciliation and branch tracking), version merge and update. In addition, maintaining a separation of concerns between the service model and best practices may be a challenge.

SUMMARY

Methods, systems, and computer program products are disclosed for managing and applying best practices to improve IT service models. An architecture for validating a service model using a plurality of best practices (PBPs) provides separation of concern between the service model and selection of best practices by enabling an independent selection of the service model and the PBPs. A best practice precedence (BPP) is configured to disambiguate conflicts between the PBPs and select a selected best practice (SBP) from the PBPs. A validation engine validates a compliance or non-compliance of the service model with the SBP. A refined service model is generated by combining selective portions of the SBP with the service model.

BRIEF DESCRIPTION OF THE DRAWINGS

Embodiments of the invention relating to both structure and method of operation may best be understood by referring to the following description and accompanying drawings:

FIG. 6 illustrates an information model for an e-mail server, according to an embodiment;

FIG. 7 illustrates an exemplary set of rules for processing best practice precedence (BPP) described with reference to FIG. 1, according to an embodiment;

DETAILED DESCRIPTION

Figure 1:
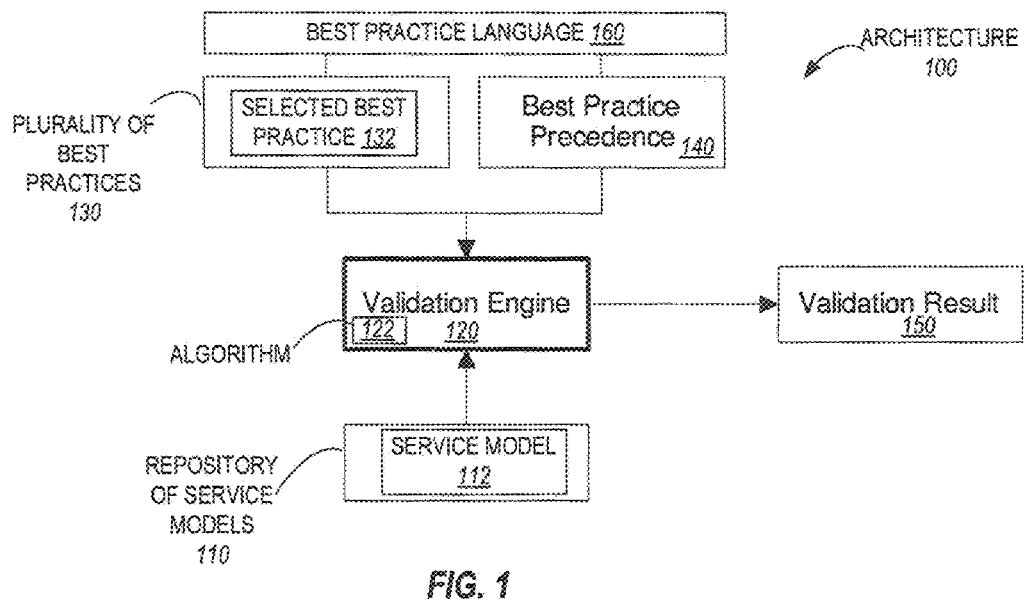
FIG. 1 illustrates an exemplary architecture for validating a service model, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

Architecture—A blueprint or basic infrastructure designed to provide one or more functions. An architecture used in an IT environment may typically include hardware, software and services building blocks that are designed to work with each other to deliver core functions and extensible functions. The core functions are typically a portion of the architecture, e.g., an operating system, which may not be modifiable by the user. The extensible functions are typically a portion of the architecture that has been explicitly designed to be customized and extended by the user as a part of the implementation process. For example, services oriented architecture (SOA) is a type of an architecture used for addressing the management's need for structuring IT services that lowers cost and enhances reusability.

Model—A model is a representation of the characteristics and behavior of a system, element, solution, or service. A model as described herein captures the design of a particular IT system, element, solution, or service. The model is a declarative specification of the structural, functional, non-functional, and runtime characteristics of the IT system, element, solution, or service. The instantiation of a model creates a model instance. Unlike object oriented (OO) theory, in which an instance object is merely a slot space, the model instance is a design space that is capable of accommodating refinement.

IT artifact—An IT artifact refers to a tangible attribute or property of an IT system. Examples of an IT artifact may include hardware, software, documentation, source code, test apparatus, project plans, educational and marketing material, and similar others. The IT artifact may be available for external or internal use.

Separation of concerns—A technique for addressing different issues of a problem individually, thereby making it possible to concentrate on each issue separately. Applying this principle can decrease the complexity by dividing the problem into different smaller issues; support division of efforts and separation of responsibilities; and improve the modularity of IT systems or artifacts.

Service—Utility or benefit provided by a provider to a consumer. The provider and the consumer may vary by application and may include an enterprise, a business unit, a business process, an application, a third party, an individual, and similar others. Enterprise services may be provided in the course of conducting the enterprise business. IT services generally refers to any application that enables the enterprise to provide utility or benefit by adding functionality to the IT infrastructure.

Service Model—A service model is the representation of a service within a SOA. It defines the externally visible description, behavior, state, and operations available from a service to other services.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Applicants recognize that it would be desirable to provide an architecture to manage best practices that would enable a user to download a service model from a web site, download a best practice for that service model from another web site, add a local best practice, and combine all of them without having to edit any of them. That is, it would be desirable to provide an architecture that separates the concerns of selecting service models and selecting best practices. Therefore, a need exists to provide improved tools and techniques to be used in the management of best practices to improve modeling of IT services.

Architecture for Validation of Service Models Against Best Practices

Systems and methods disclosed herein provide an architecture for validation of service models against best practices. The architecture provides improved tools and techniques such as a best process language (BPL) to define best practice precedence relationships between a set of best practices. The ability to configure best practice precedence relationships, which disambiguate conflicts between the set of best practices, enables independent selection and development of the service model from the set of best practices.

FIG. 1 illustrates an exemplary architecture 100 for validating a service model, according to an embodiment. The architecture 100 includes a repository 110 of service models, a validation engine 120, a plurality of best practices (PBPs) 130 associated with or referring to a service model, and a best practice precedence (BPP) 140 for the PBPs 130. The validation engine 120 is operable to receive inputs from the repository 110 of service models, PBPs 130, BPP 140 and provide a validation result 150 as an output. The repository 110 is used for storing a plurality of service models, including a service model 112 that is desired to be validated.

The architecture 100 enables the user to select the service model 112 separately and independently of selecting PBPs 130 associated with the service model 112. Additional details of the PBPs 130 are described with reference to FIG. 2. The BPP 140 defines best practice precedence relationships between the PBPs 130, thereby resolving potential conflicts or ambiguities there between. The BPP 140 is expressed outside the definition of the PBPs 130. A best practice language (BPL) 160 is used to configure the PBPs 130 and the BPP 140. Additional detail of the BPL 160 is described with reference to FIG. 4. It is understood that in a best practice validation application that includes a single best practice instead of PBPs 130, the possibility of conflicts or ambiguities within the single best practice may not arise, thereby eliminating the need for the BPP 140.

The validation engine 120 is a software system that helps manage and automate the process to validate (or invalidate) the service model 112 compared to a selected best practice (SBP) 132 selected from the PBPs 130. The validation engine 120 includes an algorithm 122 that is capable of being implemented as logic instructions. The algorithm 122 is executable to evaluate the precedence relationship defined by BPP 140 and determine which one selected best practice SBP 132 of the PBPs 130 is to be selected for the validation. The validation engine 120 is implementation dependent. The validation result 150 may be computed as a binary output (e.g., indicating a pass or fail status) or as a number (e.g., indicating a relative rating of the service model 112 compared to the SBP 132). The service model 112 may be optionally refined by combining selective portions of the SBP 132 with the service model 112 to provide a refined service model.

Best Practice Precedence Provides Separation of Concerns

Figure 2:
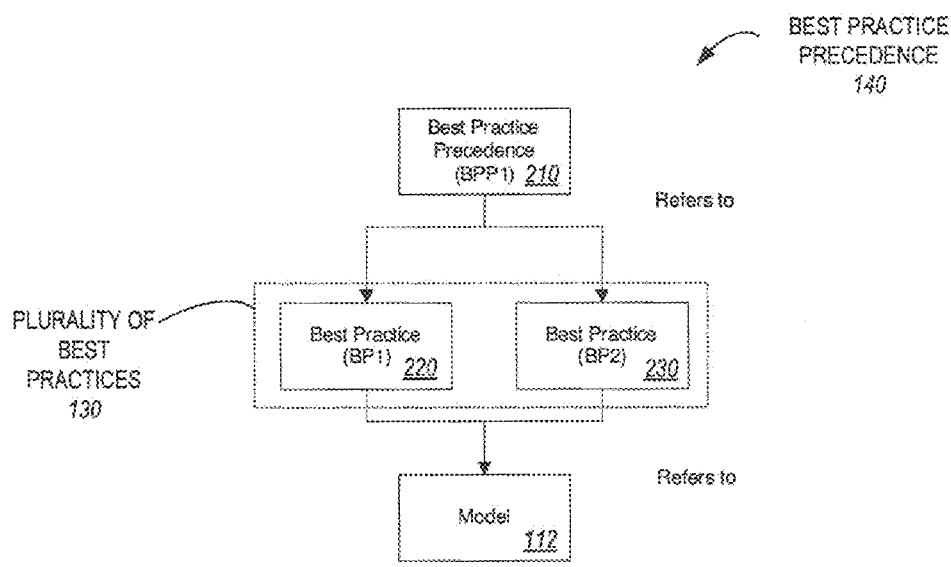
FIG. 2 illustrates an exemplary structure for configuring a best practice precedence (BPP) described with reference to FIG. 1, according to an embodiment.

FIG. 2 illustrates an exemplary structure for configuring a best practice precedence (BPP) described with reference to FIG. 1, according to an embodiment. As described earlier, the BPP 140, which is configurable to disambiguate conflicts between the PBPs 130, is expressed outside the definition of the PBPs 130. In the depicted embodiment, a first BPP (BPP1) 210 refers to at least two best practices including a first best practice (BP1) 220 and a second best practice (BP2) 230. BP1 220 and BP2 230 are included in the PBPs 130. Both BP1 220 and BP2 230 refer to the service model 112.

Decoupling the'statement of best practices from the statement of precedence between the best practices enables a flexible structure to configure the BPP 140. For example, in one application BPP1 210 may be configured by stating (using the BPL 160) that BP1 220 precedes BP2 230. In another application, a BPP2 (not shown) may be created that states the contrary, e.g., BP2 230 precedes BP1 220. Additional details of the rules used to define precedence relationships are described with reference to FIG. 8.

Figure 3:
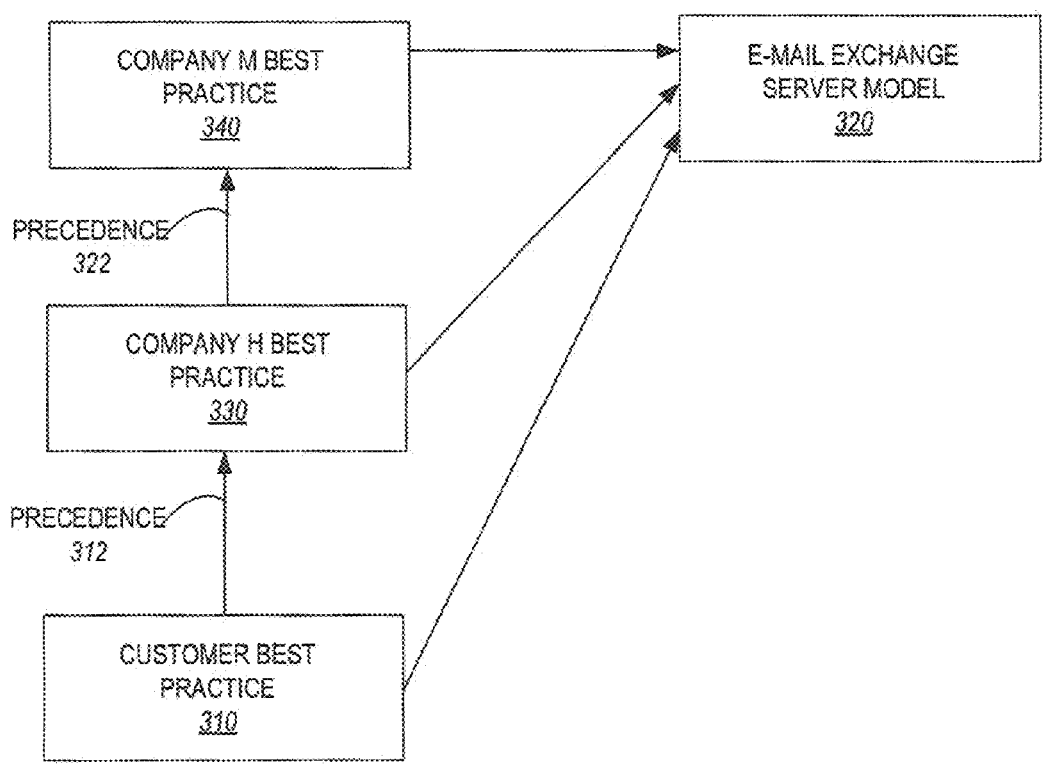
FIG. 3 illustrates an exemplary structure for configuring a hierarchical structure for best practice precedence (BPP) described with reference to FIG. 1, according to an embodiment.

FIG. 3 illustrates an exemplary structure for configuring a hierarchical structure for best practice precedence (BPP) described with reference to FIG. 1, according to an embodiment. The PBPs 130 may be selected from a repository of best practices that may be expressed by different working groups or enterprises on a single service model such as the service model 112. In the depicted embodiment, a customer best practice (CBP) 310 may be generated by the IT department for an e-mail exchange server model 320. A best practice may be issued by company H (HBP 330) on the same e-mail exchange server model 320. A hierarchical precedence relationship 312 is configured to indicate that HBP 330 precedes CBP 310. A best practice may be issued by company M (MBP 340) on the same e-mail exchange server model 320. A hierarchical precedence relationship 322 is configured to indicate that MBP 340 precedes HBP 330. In a particular embodiment, the MBP 340 may be selected as the SBP 132 described with reference to FIG. 1.

An Information Model for Best Practice

Figure 4:
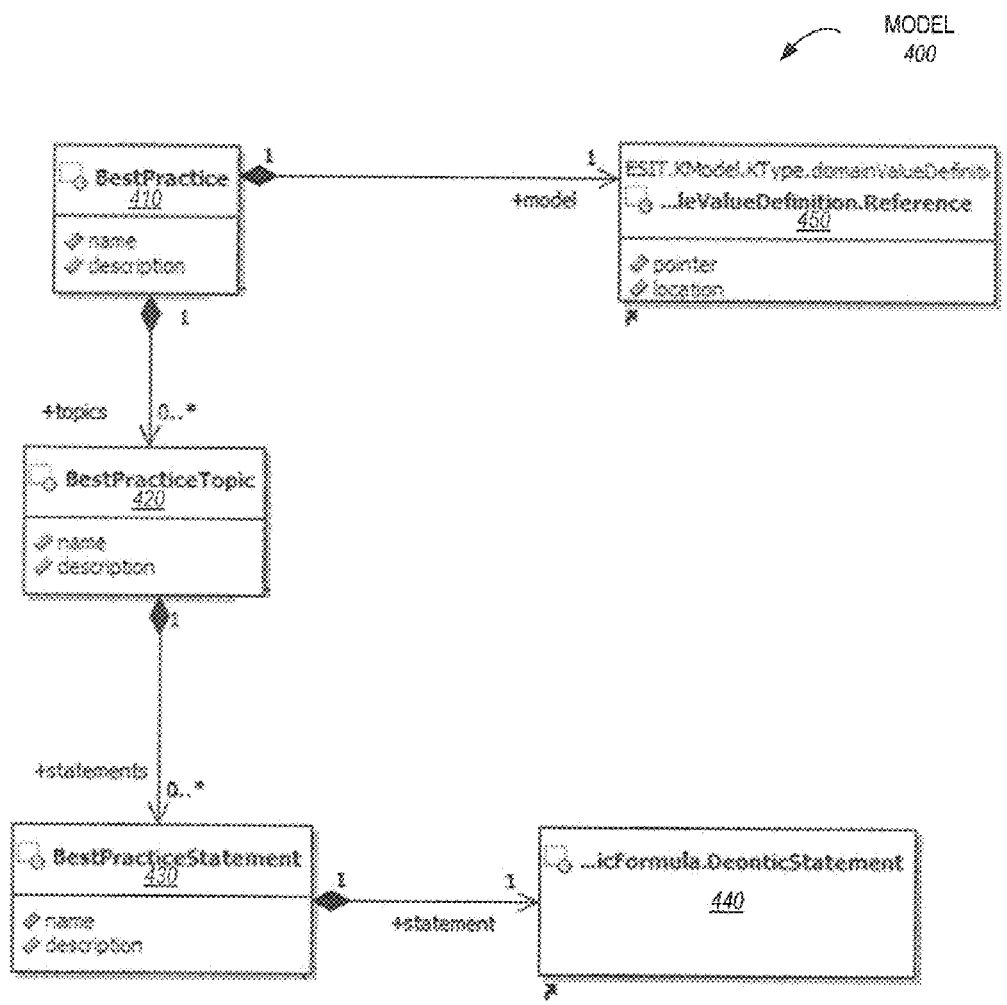
FIG. 4 illustrates an information model for a best practice (BP) of a plurality of best practices (PBPs) described with reference to FIG. 1, according to an embodiment.

FIG. 4 illustrates an information model 400 for a best practice (BP) of a plurality of best practices (PBPs) described with reference to FIG. 1, according to an embodiment. The information model 400 for the BP is illustrated as a unified modeling language (UML) class diagram. It is understood that the model 400 for the BP may be specified by using various modeling languages including, among others, the Resource Description Framework (RDF), Extensible Markup Language (XML) Schema, XML Metadata Interchange (XMI), and Java languages or a combination thereof. The RDF may include extensions such as RDF Schema and languages such as the RDF Ontology Web Language (RDF/OWL).

The model 400 includes a BP 410 module expressed over a selected service model 450 module. In an embodiment, the BP 410 module is included in the PBPs 130 and the service model 450 module is the same the service model 112 described with reference to FIG. 1. The BP 410 module is coupled to a best practice topic (BPT) 420 module. A relationship between the BP 410 module and the BPT 420 module is 1 instance to zero or more instances (indicated by 0 and *). That is, in order to bring clarity, a plurality of best practice topics, e.g., security, may be grouped in a best practice. The BPT 420 module is coupled to a best practice statement (BPS) 430 module. A relationship between the BPT 420 module and the BPS 430 module is 1 instance to zero or more instances (indicated by 0 and *). That is, in order to bring clarity, a plurality of best practice statements may be grouped to form a best practice topic. The BPS 430 module is coupled a deontic statement 440 module. A relationship between the BPS 430 module and the deontic statement 440 module is 1 instance to 1 instance. The deontic statement 440 module is configured using the PBL 160 language described with reference to FIG. 1. Additional detail of the deontic statement 440 module configured using the PBL 160 language are described with reference to FIG. 5.

Best Practice Versioning, Tagging and Rating

The development of best practices is by essence an evolutionary and collaborative process. As such, development can be internal to an enterprise or span several enterprises and workgroups. This poses challenges such as management of best practice versions as well as effective collaborative development of best practices. Concepts for managing best practices such as tagging and rating may improve the collaboration between groups.

Best Practice Versioning

In order to provide flexible versioning, each element on the best practice information model is augmented with a version number.

Best Practices Tagging

The process of tagging implies the association of a label (the tag) to an element. Tagging at the statement, topic and practice level is enabled. Each element can be associated with multiple tags. For instance, a best practice statement could be associated with a Microsoft tag, an Exchange 2007 tag as well as a Replication tag.

Whereas best practice topics are intrinsic to the design of best practices (they act as statement containers) and are shared among users, tags are user specific. This means that the same best practice can be tagged with Microsoft Exchange 2007 by one user and with MSExchange by another. The tag information is therefore stored outside the best practice model as meta data in a tag management system.

A feature associated with tags is the ability to search for element associated with similar tags and this feature is supported by the tag management system.

Best Practices Rating

Best practices often follow an evolutionary process. A set of best practices is defined based on some experience developed over time and based on those recommendations, some practices are implemented by users and others are not implemented. Some best practices turn out to less useful and others as very useful. To support collaborative design and experience sharing, it is desirable to provide a way for users to rate the usefulness of best practices. Over time, best practices that receive the highest ratings provide indication of their usefulness to previous users. Best practices with lowest ratings may be considered as just "practices" and often they can be removed from the best practice set compared to the "best practices".

An Information Model for a Best Practice Language

Figure 5:
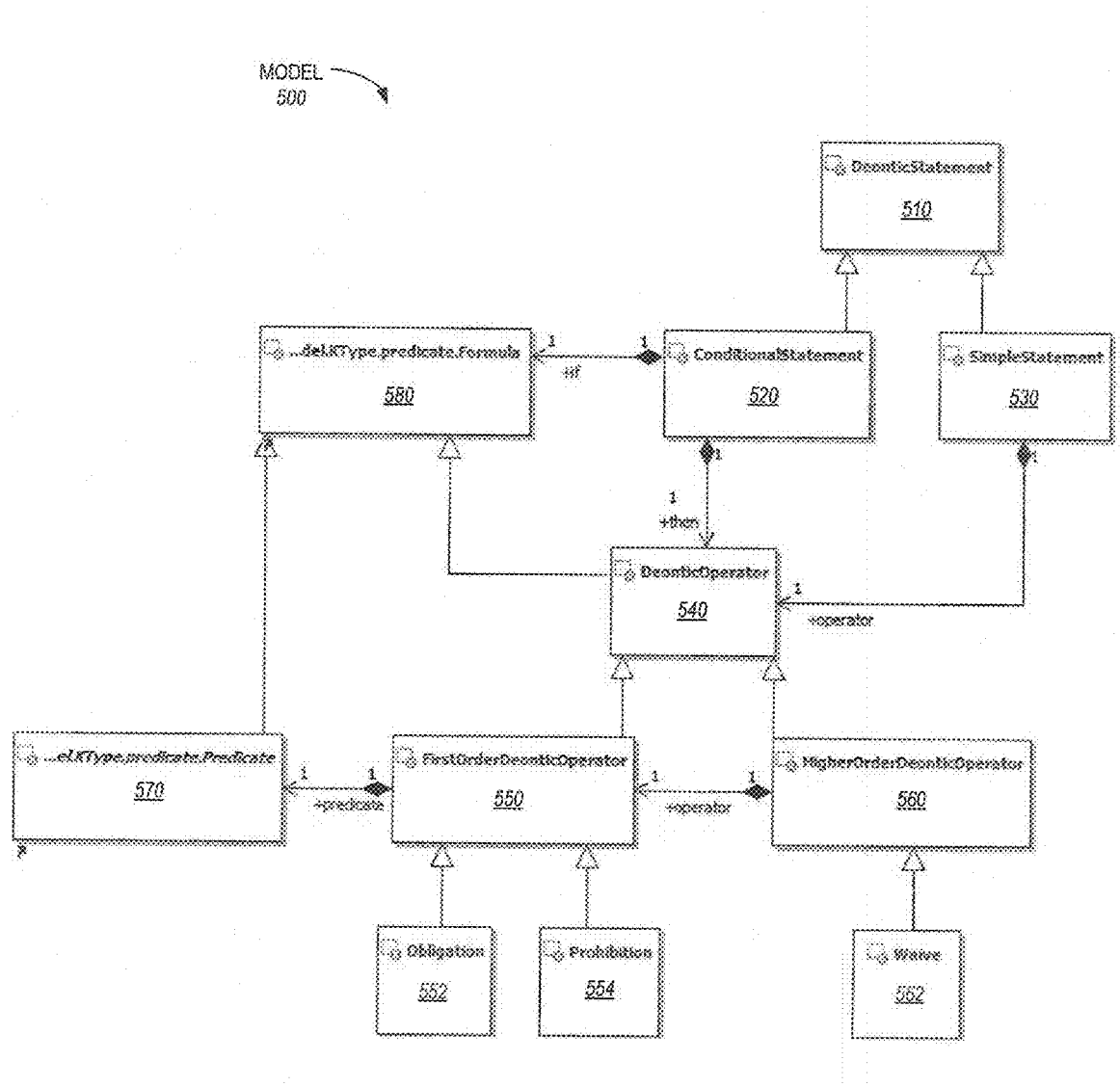
FIG. 5 illustrates an information model for a best practice language (BPL) described with reference to FIG. 1, according to an embodiment.

FIG. 5 illustrates an information model 500 for a best practice language (BPL) described with reference to FIG. 1, according to an embodiment. The information model 500 for the BPL is illustrated as a unified modeling language (UML) class diagram. It is understood that the model 500 for the BP may be specified by using various modeling languages including, among others, the Resource Description Framework (RDF), Extensible Markup Language (XML) Schema, XML Metadata Interchange (XMI), and Java languages or a combination thereof. The RDF may include extensions such as RDF Schema and languages such as the RDF Ontology Web Language (RDF/OWL).

The PBPs 130 may be modeled as deontic statements expressed over the service model 112. The information model 500 for the BPL includes a deontic statement 510 module. The deontic statement 510 is composed of a conditional statement 520 module and a simple statement 530 module, each of which include a deontic operator 540 module. The deontic operator 540 module is composed of a first order deontic operator 550 module, which includes an obligation 552 operator and a prohibition 554 operator, and a higher order deontic operator 560 module, which includes a waive 562 operator. The higher order deontic operator 560 module may be overlaid on top of the first order deontic operator 550 module. A predicate 570 is expressed over model elements of the service model 112. The first order deontic operator 550 module is overlaid on top of the predicate 570. The conditional statement 520 module is expressed over a predicate formula 580. The predicate formula 580 is composed of the predicate 570 and the deontic operator 560 module.

Expressing Statements Over a Model

A service model, e.g., the service model 112, may be recursively defined as being composed of a set of service models and associations between service models. A meta model defines the constructs that may be used to define a model. Any model constructs may be referenced by pointers that take the form of fully qualified names such as a.b.c, where a is a model, b is an element in the model and c an element in b, and so on.

The set of valid formula F expressed over a model are as follows:

$$\rho ==v, p>v, p<v, p*v \qquad \text{Proposition 100}$$

$$\rho ==\rho', \rho>\rho', \rho<\rho', \rho*\rho' \qquad \text{Proposition 200}$$

where $\rho$ and $\rho'$ are references to model elements and v is a given value. Propositions 100 and 200 represent valid propositions in the system. For completeness, the (Proposition 100) and (Proposition 200) include the classic operators of propositional logic: and, or, not. A best practices modeling language BPL is therefore defined as follows:

$$p::=false|\text{any elements in } F|\neg p|p \text{ and } p|p \text{ or } p$$

BPL therefore enables the expressed complex propositional statements over models.

Defining Best Practice Statements

A best practice is defined as a deontic statement expressed over any valid formula in BPL. The following deontic operators are defined: Obligation (O) 552 and Prohibition (F) 554. Although the Prohibition operator 554 can be defined in terms of Obligations (F(p) abbreviates O(not(p))), it is included for ease of modeling and clarity of best practices. Although deontic operators are modal logic operators, they are defined as first order logic predicates.

The semantic of the operators are defined as follows;

O(p) is true iff p is true F(p) is true iff p is not true

Conditional statements in deontic logic have received an extensive treatment. The set of valid formula is as follows: O(p), F(p), p→O(q), p→F(q) where p and q expressions in BPL.

Another form of conditional statement allows expressing relationships between deontic operators. For instance O(p)→O(q) or O(p)→F(q).

BPL is extended to include those two types of conditional statements as follows:

$$d::=O(p)|F(p)$$

$$c::=p \to d|d \to d$$

where $p::=false|\text{any elements in } F|\neg p|p$ and $p|p$ or $p$.

Waiving Obligations and Prohibitions

In the architecture 100, a proposition can imply an obligation or a prohibition. Best practice designers may want to express that in some specific cases this obligation or prohibition can be waived, acting as an exception mechanism.

For example, in the following statement;

$$p \text{ and } q \to O(r)$$

If p and q are true, the obligation O(r) will be implied. However, if p and q are the case and if t is the case, then the obligation can be waived, thereby relaxing the constraint on the best practice.

To achieve this the Waive 562 operator W is introduced. The W( ) operator allows best practice designers to waive Obligations and Prohibitions when certain conditions are met. The waive 562 operator is special in that it enables a user to retract facts.

The BPL deoritic language therefore becomes:

$$d::=O(p)|F(p) c::=p \to d|d \to d$$

where $p::=false|\text{any elements in } F|\neg p|p$ and $p|p$ or $p$.

An Information Model for an E-Mail Server

FIG. 6 illustrates an information model 600 for an e-mail server 610, according to an embodiment. Deontic statements using the best practice language (BPL) described with reference to FIG. 1 may be configured to describe one or more best practices expressed over the e-mail server 610.

The model 600 for the email server 610 can have multiple roles (CAS, MBX) and several cluster modes (none, local, RCS, CSR). The email server has a dependency association with a Server 620 expressed through the Association1 612.

A set of best practice statements could state that:

EMailServer.role==CAS→F
 (EMailServer.clusterMode==RCS)
EMailServer.role==CAS→F
 (EMailServer.clusterMode==CSR)

which express that if the server is deployed In a CAS role, a best practice is to forbid the use of RCS or CSR mode for clustering. This statement is not prescriptive since it does not force either of the valid mode, in that case none or local.

A prescriptive statement may have been written as follows:

EMailServer.role==CAS→O
 (EMailServer.clusterMode==local).

Assuming in the case of MBX the following best practice is used:

EMailServer.role==MBX→O
 (EMailServer.clusterMode==CSR)

A subsequent best practice on the use of the CSR cluster mode would state that the number of servers should at least be 3.

EMailServer.clusterMode==CSR→
O(EMailServer.Association1.End2.cardinaliry>3)

To illustrate the conditional statement between deontic operators, the following best practice statement captures the fact that if it is obliged that the cluster mode is CSR then it will be obliged to have servers with very specific configuration.

O(EMailServer.clusterMode==CSR)→O(Server.nb-CPU==4 and Server.cpuType==DualCore and memorySize>40 Gb)

This statement may have also been written as follows:

O(EMailServer.clusterMode==CSR)→O(Server.nb-CPU==4)
O(EMailServer.clusterMode==CSR)→O
 (Server.cpuType==DualCore)
O(EMailServer.clusterMode==CSR)→O(memorySize>40 Gb)

A difference between the following two statements is to be noted:

(3)   EMailServer.clusterMode==CSR→O(Server.nb-CPU==4)

(4) O(EMailServer.clusterMode==CSR)→O(Server.nbCPU==4)

Statement (3) states that if the cluster mode of the model is set to CSR then it is mandatory that the nbCPU on the Server equals to 4. This is a more stringent constraint.

Statement (4) states that if it is mandatory that the mode of the model is set to CSR then it is mandatory that the nbCPU on the Server equals to 4. In that case, if the obligation does not come into force, then the implication is not trigger and therefore, the model may be defined with the cluster mode set to CSR and the nbCPU set to 2. This would be valid with statement (4) if the O(EMailServer.clusterMode==CSR) had not been expressed. Of course, this would not be valid in statement (3).

An Exemplary Set of Rules for Processing Best Practice Precedence

FIG. 7 illustrates an exemplary set of rules 700 for processing best practice precedence (BPP) described with reference to FIG. 1, according to an embodiment. In a particular embodiment, the set of rules 700 may be used by the algorithm 122 to evaluate the precedence relationship defined by BPP 140 and determine which one selected best practice SBP 132 of the PBPs 130 is to be selected for the validation.

The set of rules 700 assume: 1) s.sub.x(a) denote the best practice statement s of topic t of the best practice p, 2) t.sub.y(b) denotes the best practice statement t of topic y of the best practice b, and 3) a precedence relationship precedes (u,v) is defined which states that u precedes v where u,v are statements, topics or practices.

The rules of processing precedence logic include:
1. Statement Precedence:
If s.sub.x(a) and t.sub.y(b) and precedes (s,t) then s.sub.x(a) is the statement to validate on the model.
2. Topic Precedence:
If s.sub.x(a) and t.sub.y(b) and precedes (x,y) then s.sub.x(a) is the statement to validate on the model.
3. Practice Precedence:
If s.sub.x(a) and t.sub.y(b) and precedes (a,b) then s.sub.x(a) is the statement to validate on the model.
4. Weak Topic to Statement Precedence:
If s.sub.x(a) and t.sub.y(b) and precedes (s,t) and precedes (y,x) then s.sub.x(a) is the statement to validate on the model.
5. Weak Practice to Topic Precedence:
If s.sub.x(a) and t.sub.y(b) and precedes (x,y) and precedes (b,a) then s.sub.x(a) is the statement to validate on the model.
6. Weak Practice to Statement Precedence:
If s.sub.x(a) and t.sub.y(b) and precedes (s,t) and precedes (b,a) then s.sub.x(a) is the statement to validate on the model.
7. Precedence Transitivity
Precedes(s,t) and precedes(t,u) then precedes(s,u) is true where s, t and u can either be statements, topics or practices.

Rules 1, 2 and 3 ensure precedence among similar constructs. Rules 4, 5 and 6 ensure hierarchical precedence in which precedence relationships between practices are less specific (weaker) than precedence relationships between topics which are themselves weaker than precedence relationships between statements. Rule 7 allows infers on precedence between constructs.

As described earlier, the architecture 100 enables the use of best practice for validating service models at design time as well as guiding the service model refinement process during instantiation. In real life applications, the number of best practice statements can be very large, thereby increasing the probability of having conflicting statements. The rules 700 enable the selection of the best practices for consistency and resolve statements containing a contradiction. For instance, a best practice or a set of best practices is inconsistent if their best practice statements lead to both O(p) and F(p).

Method for Validating a Services Model

Figure 8:
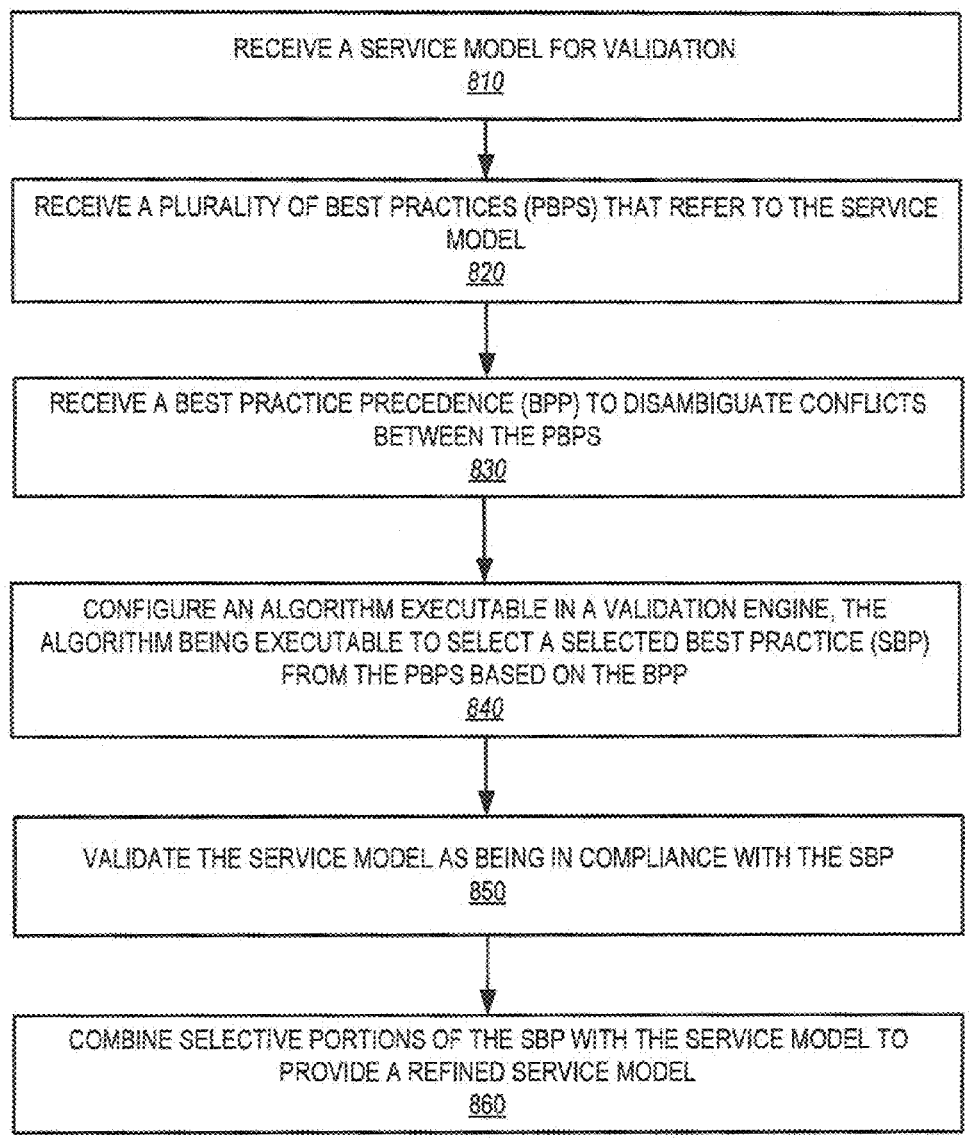
FIG. 8 is a flow chart of a method for validating a services model, according to an embodiment.

FIG. 8 is a flow chart of a method for validating a services model, according to an embodiment. In a particular embodiment, the method is used for validating the service model using the architecture 100 described with reference to FIG. 1.

At step 810, a service model is received for validation. At step 820, a plurality of best practices (PBPs) that refer to the service model are received. At step 830, a best practice precedence (BPP) is received to disambiguate conflicts between the PBPs. At step 840, an algorithm executable in a validation engine is configured. The algorithm is executable to select a selected best practice (SBP) from the PBPs based on the BPP. At step 850, the service model is validated as being in compliance with the SBP.

It is understood, that various steps described above may be added, omitted, combined, altered, or performed in different orders. For example, steps may be added to extend the structural model. At step 860, selective portions of the SBP are combined with the service model to provide a refined service model.

An Exemplary Computer System

Figure 9:
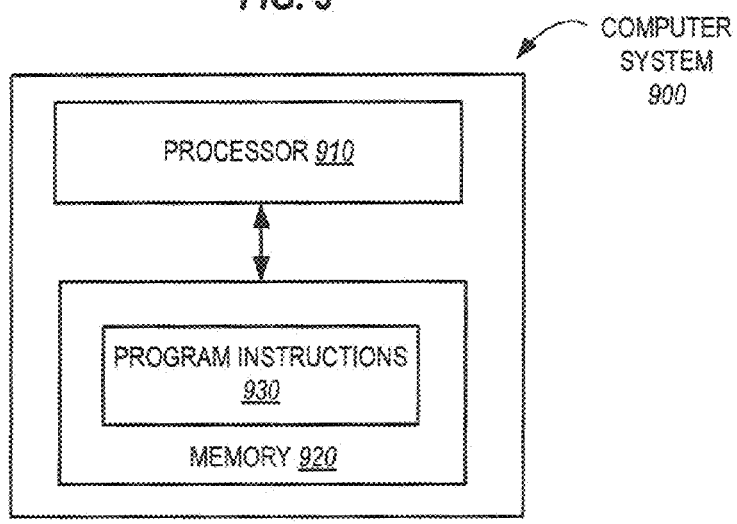
FIG. 9 illustrates a block diagram of a computer system, according to an embodiment.

FIG. 9 illustrates a block diagram of a computer system 900, according to an embodiment. The computer system 900 includes a processor 910 coupled to a memory 920. The memory 920 is operable to store program instructions 930 that are executable by the processor 910 to perform one or more functions. It should be understood that the term "computer system" is intended to encompass any device having a processor that is capable of executing program instructions from a memory medium. In a particular embodiment, the various functions, processes, methods, and operations described herein may be implemented using the computer system 900. For example, the architecture 100 and components thereof may be implemented using the computer system 900.

The various functions, processes, methods, and operations performed or executed by the system 900 can be implemented as the program instructions 930 (also referred to as software or simply programs) that are executable by the processor 910 and various types of computer processors, controllers, central processing units, microprocessors, digital signal processors, state machines, programmable logic arrays, and the like. In an exemplary, non-depicted embodiment, the computer system 900 may be networked (using wired or wireless networks) with other computer systems.

In various embodiments the program instructions 930 may be implemented in various ways, including procedure-based techniques, component-based techniques, object-oriented techniques, rule-based techniques, among others. The program instructions 930 can be stored on the memory 920 or any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

Embodiments disclosed herein provide an architecture to support the validation and refinement of service models using best practices. The tools and techniques described herein provide a best process language (BPL) to define best practice precedence relationships between a set of best practices. The best practice precedence relationship disambiguates conflicts between the set of best practices. That is, the improved architecture simplifies system maintenance performed by various roles of the IT department by enabling a user to download a service model from a web site, download a best practice for that service model from another web site, add a local best practice, and combine all of them without editing any of them, thereby avoiding challenges associated with version control and management. The architecture provides a separation of concerns between the service model and best practices and enables validation of service models against best practices at design time.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of service models such as an e-mail server are described. The illustrative system for model improvement using best practices can be used with any suitable IT models. The illustrative techniques may be used with any suitable data processing configuration and with any suitable servers, computers, and devices. In the claims, unless otherwise indicated the article "a" is to refer to "one or more than one".

What is claimed is:

1. A method comprising:
    receiving a service model for validation from a repository of service models;
    receiving a plurality of best practices (PBPs) referring to the service model;
    receiving a best practice precedence (BPP) to disambiguate conflicts between the PBPs;
    configuring an algorithm, the algorithm being executable to select a selected best practice (SBP) from the PBPs based on the BPP; and
    validating that the service model is in compliance with the SBP using a validation engine.

2. The method of claim 1 further comprising:
    grouping a plurality of best practice statements into a best practice topic; and
    grouping a plurality of best practice topics into the PBPs.

3. The method of claim 2 further comprising:
    configuring the BPP, the BPP defining a precedence relationship amongst the best practice statements, the best practice topics, and the PBPs, the precedence relationship establishing a processing hierarchy.

4. The method of claim 1 further comprising:
    configuring each one of the PBPs as deontic statements expressed over an attribute of the service model, the deontic statements being included in a best practice language (BPL).

5. The method of claim 4 further comprising:
    the deontic statements including an obligation (O) operator to define constraints, a prohibition (F) operator to define the constraints, and a waive (W) operator to define an exception to the constraints.

6. The method of claim 1 further comprising:
    combining selective portions of the SBP with the service model to provide a refined service model.

7. The method of claim 1 further comprising:
    separating concern between the service model and the PBPs by independently selecting the service model and the PBPs.

8. A computer system for validating a service model, the computer system comprising:
    a computer processor; and
    logic instructions on tangible computer readable media and executable by the computer processor to cause the computer processor to:
        receive a service model for validation;
        receive a plurality of best practices (PBPs) referring to the service model;
        receive a best practice precedence (BPP) to disambiguate conflicts between the PBPs;
        configure an algorithm, the algorithm being executable to select a selected best practice (SBP) from the PBPs based on the BPP;
        validate that the service model is in compliance with the SBP.

9. The computer system according to claim 8 further comprising:
    logic instructions to cause the computer processor to:
        group a plurality of best practice statements into a best practice topic; and
        group a plurality of best practice topics into the PBPs.

10. The computer system according to claim 9 further comprising:
    logic instructions to cause the computer processor to:
        configure the BPP, the BPP defining a precedence relationship amongst the best practice statements, the best practice topics, and the PBPs, the precedence relationship establishing a processing hierarchy.

11. The computer system according to claim 8 further comprising:
    logic instructions to cause the computer processor to:
        configure the PBPs as deontic statements expressed over an attribute of the service model, the deontic statements being included in a best practice language (BPL).

12. The computer system according to claim 11 further comprising:
the deontic statements including an obligation (O) operator to define constraints, a prohibition (F) operator to define the constraints, and a waive (W) operator to define an exception to the constraints.

13. The computer system according to claim 8 further comprising:
logic instructions to cause the computer processor to:
combine selective portions of the SBP with the service model to provide a refined service model.

14. The computer system according to claim 8 further comprising:
logic instructions to cause the computer processor to:
separate concern between the service model and the PBPs by independently selecting the service model and the PBPs.

15. A nontransitory computer program product for managing best practices, comprising: logic instructions on computer readable storage media executable to cause a computer processor to: receive a service model for validation; receive a plurality of best practices (PBPs) referring to the service model; receive a best practice precedence (BPP) to disambiguate conflicts between the PBPs; configure an algorithm, the algorithm is executable to select a selected best practice (SBP) from the PBPs based on the BPP; and validate that the service model is in compliance with the SBP.

16. The nontransitory computer program product of claim 15, further comprising: logic instructions on computer readable storage media executable to cause a computer processor to: group a plurality of best practice statements into a best practice topic; and group a plurality of best practice topics into the PBPs.

17. The nontransitory computer program product of claim 16 further comprising: logic instructions on computer readable storage media executable to cause a computer processor to: configure the BPP, the BPP defining a precedence relationship amongst the best practice statements, the best practice topics, and the PBPs, the precedence relationship establishing a processing hierarchy.

18. The nontransitory computer program product of claim 15 further comprising: logic instructions on computer readable storage media executable to cause a computer processor to: configure each one of the PBPs as deontic statements expressed over an attribute of the service model, the deontic statements being included in a best practice language (BPL).

19. The nontransitory computer program product of claim 15 further comprising: the deontic statements including an obligation (O) operator to define constraints, a prohibition (F) operator to define the constraints, and a waive (W) operator to define an exception to the constraints.

20. The nontransitory computer program product of claim 15 further comprising: logic instructions on computer readable storage media executable to cause a computer processor to: combine selective portions of the SBP with the service model to provide a refined service model.

21. The nontransitory computer program product of claim 15 further comprising: logic instructions on computer readable storage media executable to cause a computer processor to: separate concern between the service model and the PBPs independently selecting the service model and the PBPs.

* * * * *